No. 12,628. REISSUED APR. 2, 1907.

S. U. BARR.

WINDOW.

APPLICATION FILED FEB. 11, 1907.

3 SHEETS—SHEET 1.

WITNESSES

H. G. Ritterich

Rud. G. Hoosten

INVENTOR

Sidney U. Barr

BY Munn & Co.

ATTORNEYS

No. 12,628. REISSUED APR. 2, 1907.
S. U. BARR.
WINDOW.
APPLICATION FILED FEB. 11, 1907.
3 SHEETS—SHEET 2.
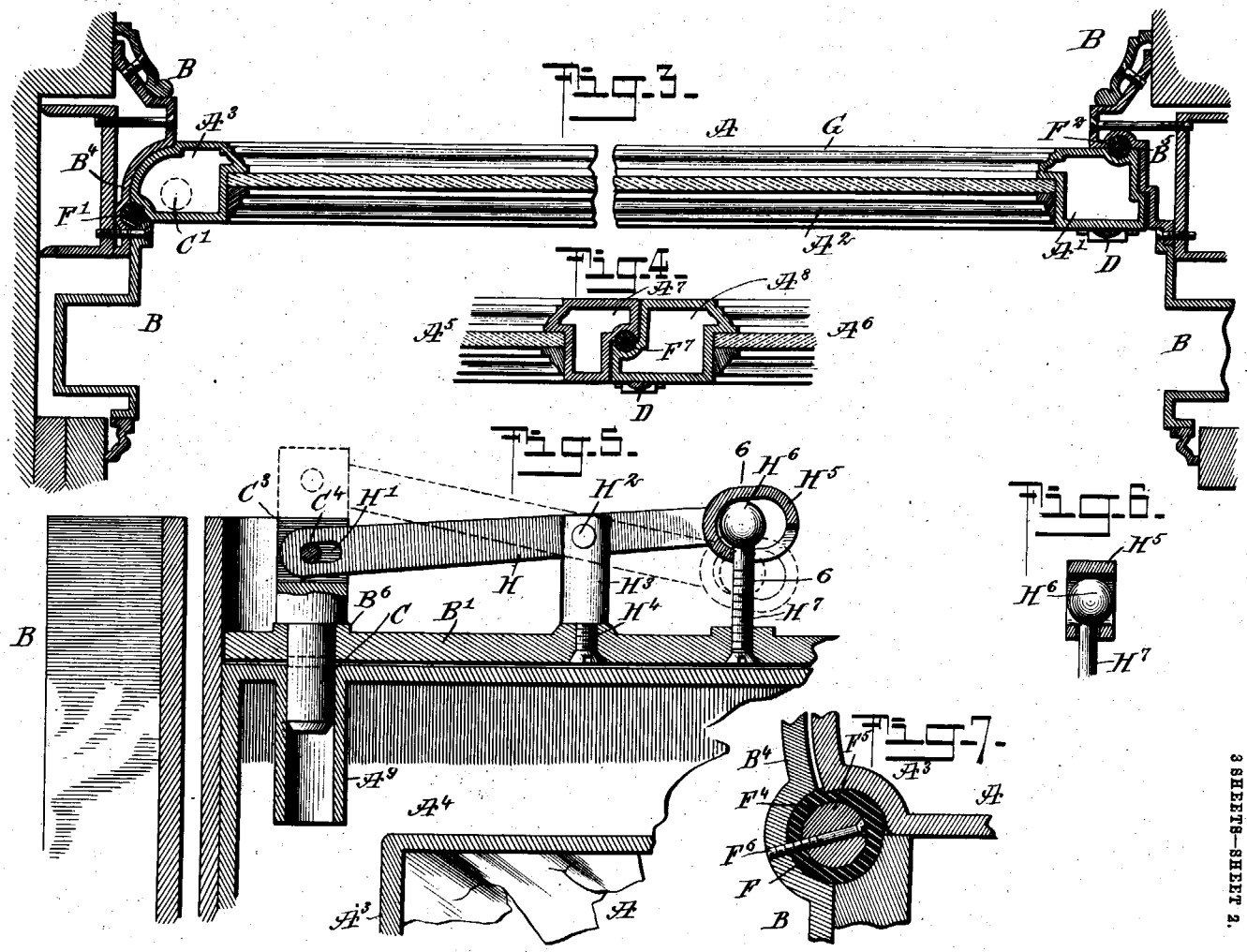
WITNESSES
H. G. Dieterich
Roy J. Hoover
INVENTOR
Sidney U. Barr
BY Munn & Co
ATTORNEYS No. 12,628. REISSUED APR. 2, 1907.

S. U. BARR.

WINDOW.

APPLICATION FILED FEB. 11, 1907.

3 SHEETS—SHEET 3.

WITNESSES

H. T. Dieterich

Geo. J. Hooker

INVENTOR

Sidney U. Barr

BY Munn & Co

ATTORNEYS

UNITED STATES PATENT OFFICE.

SIDNEY U. BARR, OF NEW YORK, N. Y.

WINDOW.

No. 12,628. Specification of Reissued Letters Patent. Reissued April 2, 1907.

Original No. 797,835, dated August 22, 1905. Application for reissue filed February 11, 1907. Serial No. 356,941.

*To all whom it may concern:*

Be it known that I, SIDNEY U. BARR, a citizen of the United States, and a resident of the city of New York, borough of Brooklyn, in the county of Kings and State of New York, have invented a new and Improved Window, of which the following is a full, clear, and exact description.

The object of the invention is to provide a new and improved window which is simple and compact in construction, completely air-tight and dustproof, and arranged to permit convenient opening or closing of the sash.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
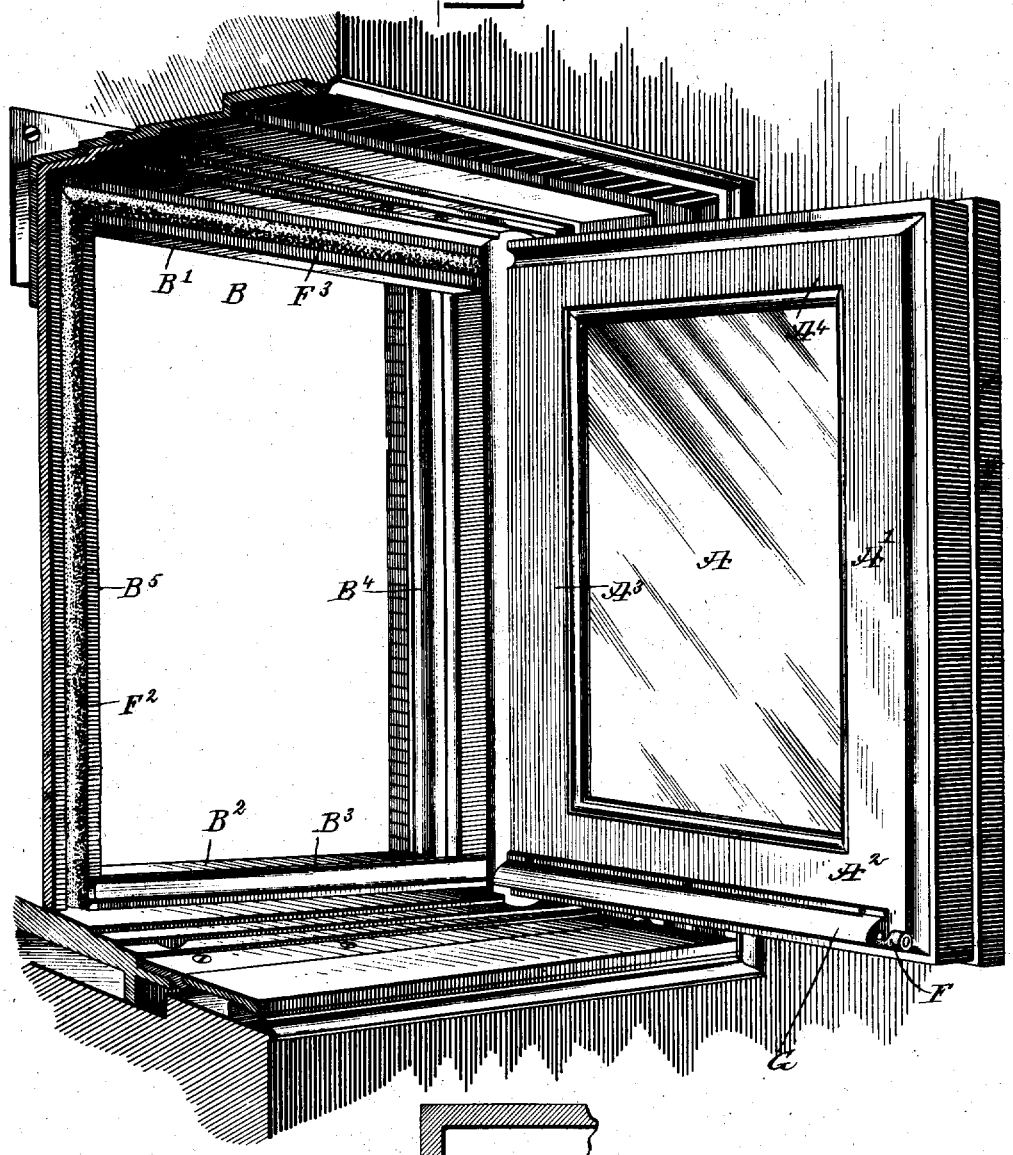
Figure 2:
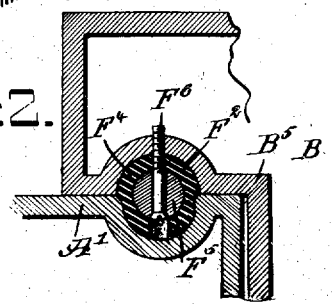
Figure 8:
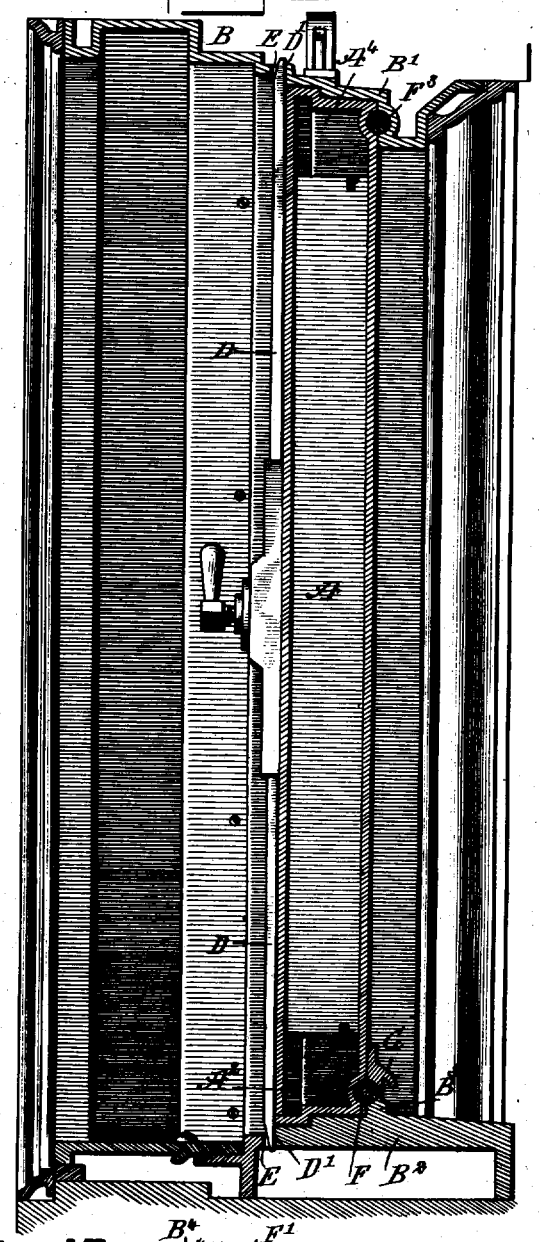
Figure 9:
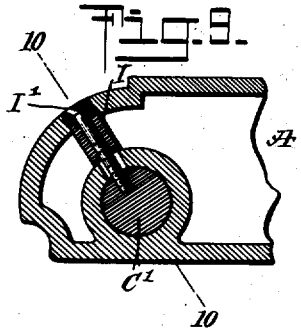
Figure 10:
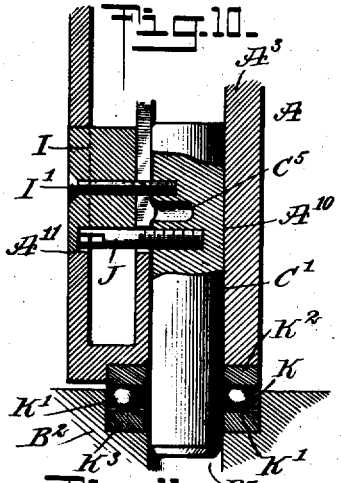
Figure 11:
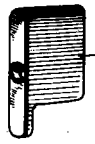

Figure 1 is a sectional perspective view of the improvement, showing a window provided with a single pivoted sash, the latter being in an open position. Fig. 2 is an enlarged sectional plan view of the packing in position between the sash and window-frame at the outer stile of the sash. Fig. 3 is a sectional plan view of the improvement, showing the sash in a closed position. Fig. 4 is a sectional plan view of the packing arranged between the meeting-stiles of a window having two pivoted sashes. Fig. 5 is an enlarged sectional side elevation of the upper pivot for the sash and a means carried by the window-frame for raising and lowering the pivot. Fig. 6 is a cross-section of part of the same on the line 6 6 of Fig. 5. Fig. 7 is an enlarged sectional plan view of the packing at the joint of the pivoted end of the sash and a window-frame. Fig. 8 is a cross-section of the improvement. Fig. 9 is a sectional plan view of the lower pivot in position on the sash. Fig. 10 is a sectional side elevation of the same on the line 10 10 of Fig. 9. Fig. 11 is a perspective view of the closing-block in the sash opposite the lower pivot, and Fig. 12 is a sectional plan view of the improvement as arranged on a hinged sash.

Figure 12:
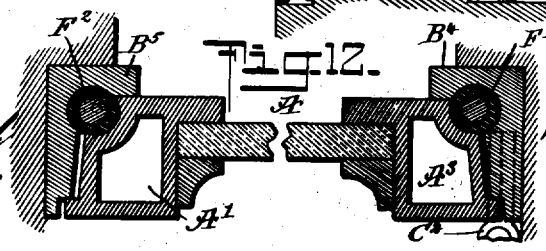

The sash A is mounted to swing in a window-frame B either by the use of vertically-alined pivots C C′, as shown in Figs. 3, 5, and 10, or by employing hinges $C^2$, as indicated in Fig. 12. The sash A is locked on the top and bottom against accidental opening by manually-controlled bolts D of the extension or Cremorne type, the bolts being preferably arranged on the inner face of the stile A′ of the sash A, (see Fig. 3,) the said bolts D also serving to draw the sash firmly into a final closed position by making the ends D′ of the bolts tapering or wedge-shaped (see Fig. 8) and engaging the wedge-shaped ends with keepers E, attached to or formed on the top cross-bar B′ and the sill $B^2$ of the window-frame B.

In order to render the window practically air and dust proof when the sash is in a closed position, packings or cushions F, F′, $F^2$, and $F^3$ are employed and arranged in the joints between the window-frame B and the sash A, each of the packings being tubular and preferably made of a piece of rubber tubing $F^4$ and a rigid core or rod $F^5$, extending through the tubing. The packing F is the bottom packing, and the packings F′ and $F^2$ the side packings, while the packing $F^3$ is the top packing. The packings F, F′, $F^2$, and $F^3$ are arranged in registering rabbets or grooves formed on the contacting surfaces of the window-frame B and the sash A, and the packings F′, $F^2$, and $F^3$ are fastened in position in the corresponding rabbets in the window-frame, while the packing F is secured in position in the rabbet on the lower cross-bar $A^2$ of the sash, and thus swings with the same, while the other packings F′, $F^2$, and $F^3$ are fixed on the stationary window-frame. The packings F, F′, $F^2$, and $F^3$ are located at contacting surfaces and located on the face-joints of the frame of the sash, the packings F, $F^2$, and $F^3$ being located at the outer face-joints of the sash, (see Figs. 3 and 8,) while the packing F′ is located at the inner face of the joint of the sash. (See left-hand side of Fig. 3.)

In order to secure a packing in position, screws $F^6$ are employed, (see Figs. 2 and 7,) each screw passing transversely through the packing to screw in the corresponding part of the sash or frame, the head of the screw being countersunk in the rod $F^5$ and located directly opposite the entrance of the rabbet to be engaged by the packing on closing the window-sash. It is understood that each packing is secured in one of the rabbets of a pair of registering rabbets and is adapted to be engaged by the other or receiving rabbet of the pair of rabbets on closing the sash, and this receiving-rabbet has its entrance somewhat reduced (see Figs. 2 and 7) and its back formed with a recess or enlargement, so that when the packing on closing the sash passes into the receiving-rabbet it is pressed and a portion of it is deflected into the recess or enlargement at the back of the receiving-rabbet, so that the packing fully fills the registering rabbets, thus producing a completely air-tight and dustproof joint between the sash and the frame.

By the arrangement described the sash is not warped, as the packing-tubing $F^4$ is not squeezed in between adjacent contacting surfaces of the frame and sash when closing the latter, as the deflected material readily passes into the enlargement in the back of the receiving-rabbet, as will be readily understood by reference to Figs. 2 and 7. It is understood that when the sash is closed by a person the packings are not finally pressed into the receiving-rabbets until the bolts D are moved into engagement with their keepers, so that the sash is forcibly drawn to its final position, and consequently sufficient pressure is exerted on the packing-tubings $F^4$ to deflect a portion thereof, as previously explained.

The bottom packing F, as shown in Fig. 1, is secured in the rabbet on the lower cross-bar $A^2$ of the sash A and is adapted to pass into a rabbet formed on the inner face of the raised portion $B^3$ of the sill $B^2$, the said sill-rabbet having its entrance narrowed and its back enlarged or recessed, as previously explained. A portion of this packing F also fits into a rabbet formed in the under side of a water-table G, secured to or forming part of the lower cross-bar $A^2$ of the sash, and this water-table G projects outwardly beyond the packing F and over and beyond the said raised sill portion $B^3$ to carry the water coming down on the outer face of the sash clear of the packing and the said raised sill portion.

The packing F′ at the pivoted stile $A^3$ of the sash (see Fig. 3) is fastened to the jamb $B^4$ of the window-casing and is engaged by a corresponding rabbet on the stile $A^3$ at the time the sash swings into a closed position, as plainly indicated to the left of Fig. 3. By reference to this figure it will be seen that the packing F′ is arranged at the end of the segmental portion of the stile $A^3$, which segmental portion fits a corresponding segmental portion on the jamb $B^4$.

The packing $F^3$ (shown on the right-hand side of Fig. 3) is secured in a rabbet in the jamb $B^5$ of the window-frame, and this packing is engaged by a rabbet on the outer face of the stile A′.

The top packing $F^3$ is secured to the top cross-bar B′ of the window-frame and is engaged by a rabbet formed on the outer face of the top cross-bar $A^4$ of the sash A.

In case two sashes $A^4$ and $A^8$ are hung on the jambs of the window-frame then a packing $F^7$, similar to the packings F, F′, $F^2$, and $F^3$, is placed at the joint of the meeting-stiles $A^7$ and $A^8$, (see Fig. 4,) the packing being secured in a rabbet on one of the stiles to be engaged by the rabbet on the other stile when closing the sashes.

The upper pivot C for the sash A (see Fig. 5) normally engages a bearing $A^9$ on the top cross-bar $A^4$ of the sash A and a bearing $B^6$ on the top cross-bar B′ of the window-frame B, and the head $C^3$ of the pivot C is normally seated on the top of the bearing $B^6$. On the head $C^3$ is arranged a transverse pin $C^4$, projecting into the elongated slot H′ of a lever H, fulcrumed at $H^2$ on a standard $H^3$, secured by a screw $H^4$ to the top cross-bar B′ of the window-frame. The free end of the lever H is formed with a cage $H^5$, engaged by a ball $H^6$, held on the upper end of a screw $H^7$, screwing in the top cross-bar B′ of the window-frame B, the head of the screw extending on the under side of the cross-bar, so that when the sash A is opened free access is had to the said screw to enable the operator to turn it, so as to screw the same downward to exert a downward pull on the cage $H^5$ to impart a swinging motion to the lever H for the latter to raise the pivot C and disengage the same from the bearing $A^9$. This operation is necessary whenever it is desired to remove the sash A from the frame for repairs or other purposes. In a like manner on screwing the screw-rod $H^7$ upward back into its former position a return swinging motion is given to the lever H, so as to slide the pivot C downward to reëngage the lower end thereof with the bearing $A^9$ whenever it is desired to hang the sash in the window-frame.

The lower pivot C′ is mounted to slide in a bearing $A^{10}$ in the stile $A^3$ and is adapted to engage a bearing $B^7$ in the sill $B^2$ of the window-frame, and this pivot C′ is adapted to be moved upward out of engagement with the bearing $B^7$ whenever it is desired to remove the sash—that is, both pivots C and C′ are disengaged from their bearings $A^9$ and $B^7$ to allow of removing the sash from the window-frame. For the purpose mentioned the lower pivot C′ is provided with a recess $C^5$, (see Fig. 10,) adapted to be engaged by a suitable tool in the hands of the operator introduced through a recess $A^{11}$, formed in the stile $A^3$. This recess $A^{11}$ is normally closed by a closing-block I, fitting the recess and secured to the pivot C′ by a screw I′. A stop-pin J screws in the pivot C′ and likewise extends in the recess $A^{11}$, and this stop-pin limits the downward sliding motion of the pivot C′, and the outer slotted end of the stop-pin J permits the insertion of a tool to push the pivot C′ downward whenever it is desired to reëngage the pivot C′ with its bearing $B^7$.

In order to insure an easy swinging of the sash A, the pivotal end of the sash rests and travels on a ball-bearing (see Fig. 10) consisting of a ring K, in which are held balls K′, projecting beyond the top and bottom faces of the ring, the balls being engaged at the top by a ring-shaped bearing $K^2$, fitting in a recess in the under side of the stile $A^3$ and secured to the latter by screws or the like, (not shown,) and the lower ends of the balls K′ rest on a ring-shaped bearing $K^3$, seated in a recess in the sill $B^2$, the said recess being sufficiently deep to also contain the ball-bearing.

By reference to Fig. 10 it will be seen that the ring K and bearings $K^2$ and $K^3$ are concentric with the pivot-pin C′, and the latter when raised passes out of the bearing $K^3$ and ring K to allow of removing the sash, as previously explained—that is, when the pivot C is raised out of the bearing $A^9$ and the pivot C′ is raised out of engagement with the bearing $K^3$ and ring K.

Having thus described my invention, I claim as new and desire to secure by Letters Patent—

1. A window comprising a window-frame, a sash mounted to swing on the said window-frame, and tubular packings in the joints of the frame and sash and pressed on closing the sash, the joints embodying registering grooves in the frame and sash and having recesses for receiving the portions of the packings deflected on pressing the packings, and the latter completely filling said grooves in the closed position of the sash.

2. A window comprising a window-frame, a sash mounted to swing on the said frame, packings in the joints of the frame and sash at the sides, top and bottom, the bottom packings being attached to the sash and the side and top packings being secured to the window-frame, and a water-table on the sash and extending over and beyond the said bottom packing to carry the water clear of the packing, the said water-table forming a portion of the seat of the bottom packing, said joints embodying registering grooves in the frame and sash, and the said packings completely filling the grooves in the closed position of the sash.

3. A window comprising a window-frame, a sash mounted to swing on the said frame, and packings in the joints of the frame and sash, each packing consisting of a compressible tube and a rigid core extending through the tube, and said joints embodying registering grooves in the frame and sash which are completely closed by the packings in the closed position of the sash.

4. A window comprising a window-frame, a sash mounted to swing on the said frame, and packings in the joints of the frame and sash, each packing consisting of a compressible tube and a rigid core extending through the tube, and screws passing transversely through the core and a portion of the tube to screw into the corresponding joint part to secure the packing in position; the heads of the screws being free of the tubes and located opposite the portions to be pressed on closing the sash.

5. A window comprising a window-frame, a window-sash, the frame and sash having pairs of registering rabbets, and compressible packings one for each of the said pairs of registering rabbets, each packing being somewhat larger in cross-section than its corresponding pair of registering rabbets to press the packing on closing the sash and deflecting a portion thereof, one of the rabbets having an enlargement for the reception of the deflected portion of the packing.

6. A window comprising a window-frame, a window-sash, the frame and sash having pairs of registering rabbets, and compressible packings one for each of the said pairs of registering rabbets, each packing being secured in one of the rabbets of the pair of rabbets, and the other rabbet of the pair being somewhat narrowed at the entrance to cause a pressing of the packing on closing the sash.

7. A window comprising a window-frame, a window-sash, the frame and sash having pairs of registering rabbets, and compressible packings one for each of the said pairs of registering rabbets, each packing being secured in one of the rabbets of the pair of rabbets, and the other rabbet of the pair being somewhat narrowed at the entrance to cause a pressing of the packing on closing the sash, the narrowed rabbet having its back portion enlarged for the reception of the deflected portion of the packing due to the pressing.

8. A window comprising a window-frame, a sash, and pivots on which the sash is hung in the window-frame, the said pivots being slidably mounted to disconnect the sash from the window-frame.

9. A window comprising a window-frame, a sash, vertically-alined pivots on which the sash is hung on the window-frame, and manually-controlled means connected with the upper pivot, to disengage the same from the sash, the said pivots being slidably mounted.

10. A window comprising a window-frame, a sash, vertically-alined pivots on which the sash is hung on the window-frame, a lever pivotally connected with the upper pivot and fulcrumed on the top cross-bar of the window-frame, and a screw screwing in the top cross-bar of the window-frame and having a ball-and-socket connection with the said lever.

11. A window comprising a window-frame, a sash, vertically-alined pivots for hanging the sash in the window-frame, and removable means on the sash, for gaining access to the lower pivot, to raise or lower the latter.

12. A window comprising a window-frame, a sash, vertically-alined pivots for hanging the sash in the window-frame, removable means on the sash, for gaining access to the lower pivot, to raise or lower the latter, and a pin on the said lower pivot, normally concealed by the said removable means.

13. In a window, a pivot, a lever pivoted intermediate of its ends and having one end pivotally connected with the pivot, and means connected with the other end of the lever for swinging the lever on its pivot.

14. In a window, a pivot, a pivoted lever having one end loosely pivoted to the pivot, and a screw screwing into a fixed support and engaging the other end of said lever.

15. In a window, a sash having a bearing in its lower end and a recess leading into the bearing, a pivot in the recess and provided with means whereby it may be raised, and a block for closing the said recess.

16. In a window, a sash having a bearing in its lower end and a recess leading to the bearing, a pivot in the bearing and provided with a recess, and a stop-pin projecting into the recess of the sash, and a filling-block in the recess of the sash and secured to the pivot.

In testimony whereof I have signed my name to this specification in the presence of two subscribing witnesses.

SIDNEY U. BARR.

Witnesses:

H. C. REYNOLDS,

D. P. HOAGLAND.